US012625587B2

(12) United States Patent
Huang et al.

(10) Patent No.: US 12,625,587 B2
(45) Date of Patent: May 12, 2026

(54) TOUCH PANEL, DISPLAY MODULE, AND DISPLAY DEVICE

(71) Applicant: HKC CORPORATION LIMITED, Shenzhen (CN)

(72) Inventors: Peidi Huang, Shenzhen (CN); Wei Fu, Shenzhen (CN); Lidan Ye, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 82 days.

(21) Appl. No.: 18/645,828

(22) Filed: Apr. 25, 2024

(65) Prior Publication Data

US 2024/0377913 A1     Nov. 14, 2024

(30) Foreign Application Priority Data

May 10, 2023     (CN) .......................... 202310518763.4

(51) Int. Cl.
G06F 3/044         (2006.01)
G06F 3/041         (2006.01)
(52) U.S. Cl.
CPC ........ G06F 3/0443 (2019.05); G06F 3/04144 (2019.05)
(58) Field of Classification Search
CPC .............. G06F 3/0443; G06F 3/04144; G06F 3/041662; G06F 3/0412; G06F 3/0414;
(Continued)

(56) References Cited

U.S. PATENT DOCUMENTS

2002/0094660 A1* 7/2002 Getz ....................... G06F 3/045
                                                                   438/455
2014/0202259 A1* 7/2014 Ikebe .................. G06F 3/04144
                                                                   73/862.041
(Continued)

FOREIGN PATENT DOCUMENTS

CN         102163100 A      8/2011
CN         103713793 A      4/2014
(Continued)

OTHER PUBLICATIONS

The first office action issued in corresponding CN application No. 202310518763.4 dated Jun. 16, 2023.
(Continued)

*Primary Examiner* — Temesghen Ghebretinsae
*Assistant Examiner* — Ivelisse Martinez Quiles
(74) *Attorney, Agent, or Firm* — HAUPTMAN HAM, LLP

(57) ABSTRACT

A touch panel is provided. The touch panel includes a touch electrode layer and a pressure sensing layer. The touch electrode layer includes multiple touch regions. The pressure sensing layer includes multiple sensing assemblies. Positions of the multiple sensing assemblies correspond to positions of the multiple touch regions, respectively. The touch electrode layer is configured to sense multiple touched points. The multiple touched points include at least two actually touched points. The multiple sensing assemblies are configured to sense pressed points. Each of the pressed points is used to determine one touch region where one actually touched point is located. A display module and a display device are further provided.

17 Claims, 9 Drawing Sheets

21

(58) Field of Classification Search
CPC ......... G06F 3/0445; G06F 2203/04104; G06F 2203/04106; G02F 1/13338
See application file for complete search history.

(56) References Cited

U.S. PATENT DOCUMENTS

| | | | |
|---|---|---|---|
| 2015/0116073 A1* | 4/2015 | Suzuki | H03K 17/9647 |
| | | | 29/622 |
| 2018/0018044 A1 | 1/2018 | Hong et al. | |
| 2018/0307365 A1* | 10/2018 | Chen | G06F 1/3262 |
| 2020/0371634 A1 | 11/2020 | Maekawa et al. | |
| 2024/0419283 A1* | 12/2024 | Zhou | G06F 3/04146 |

FOREIGN PATENT DOCUMENTS

| | | | |
|---|---|---|---|
| CN | 104598066 A | 5/2015 |
| CN | 106775087 A | 5/2017 |
| CN | 106919283 A | 7/2017 |
| CN | 107340897 A | 11/2017 |
| CN | 111665989 A | 9/2020 |
| CN | 111762023 A | 10/2020 |
| CN | 112214132 A | 1/2021 |
| CN | 112817483 A | 5/2021 |
| CN | 113495641 A | 10/2021 |
| CN | 114935982 A | 8/2022 |
| JP | H08171447 A | 7/1996 |
| WO | 2017113761 A1 | 7/2017 |

OTHER PUBLICATIONS

The second office action issued in corresponding CN application No. 202310518763.4 dated Jun. 29, 2023.
Notice of allowance issued in corresponding CN application No. 202310518763.4 dated Jul. 11, 2023.

* cited by examiner

10

10a

| Z(m1，n1) | Z(m2，n1) | Z(m3，n1) | Z(m4，n1) | Z(m5，n1) | Z(m6，n1) | Z(m7，n1) |
|----------|----------|----------|----------|----------|----------|----------|
| Z(m1，n2) | Z(m2，n2) | Z(m3，n2) | Z(m4，n2) | Z(m5，n2) | Z(m6，n2) | Z(m7，n2) |
| Z(m1，n3) | Z(m2，n3) | Z(m3，n3) | Z(m4，n3) | Z(m5，n3) | Z(m6，n3) | Z(m7，n3) |
| Z(m1，n4) | Z(m2，n4) | Z(m3，n4) | Z(m4，n4) | Z(m5，n4) | Z(m6，n4) | Z(m7，n4) |
| Z(m1，n5) | Z(m2，n5) | Z(m3，n5) | Z(m4，n5) | Z(m5，n5) | Z(m6，n5) | Z(m7，n5) |

| P(a1，b1) | P(a2，b1) | P(a3，b1) | P(a4，b1) | P(a5，b1) | P(a6，b1) | P(a7，b1) |
|---|---|---|---|---|---|---|
| P(a1，b2) | P(a2，b2) | P(a3，b2) | P(a4，b2) | P(a5，b2) | P(a6，b2) | P(a7，b2) |
| P(a1，b3) | P(a2，b3) | P(a3，b3) | P(a4，b3) | P(a5，b3) | P(a6，b3) | P(a7，b3) |
| P(a1，b4) | P(a2，b4) | P(a3，b4) | P(a4，b4) | P(a5，b4) | P(a6，b4) | P(a7，b4) |
| P(a1，b5) | P(a2，b5) | P(a3，b5) | P(a4，b5) | P(a5，b5) | P(a6，b5) | P(a7，b5) |

Figure 11:
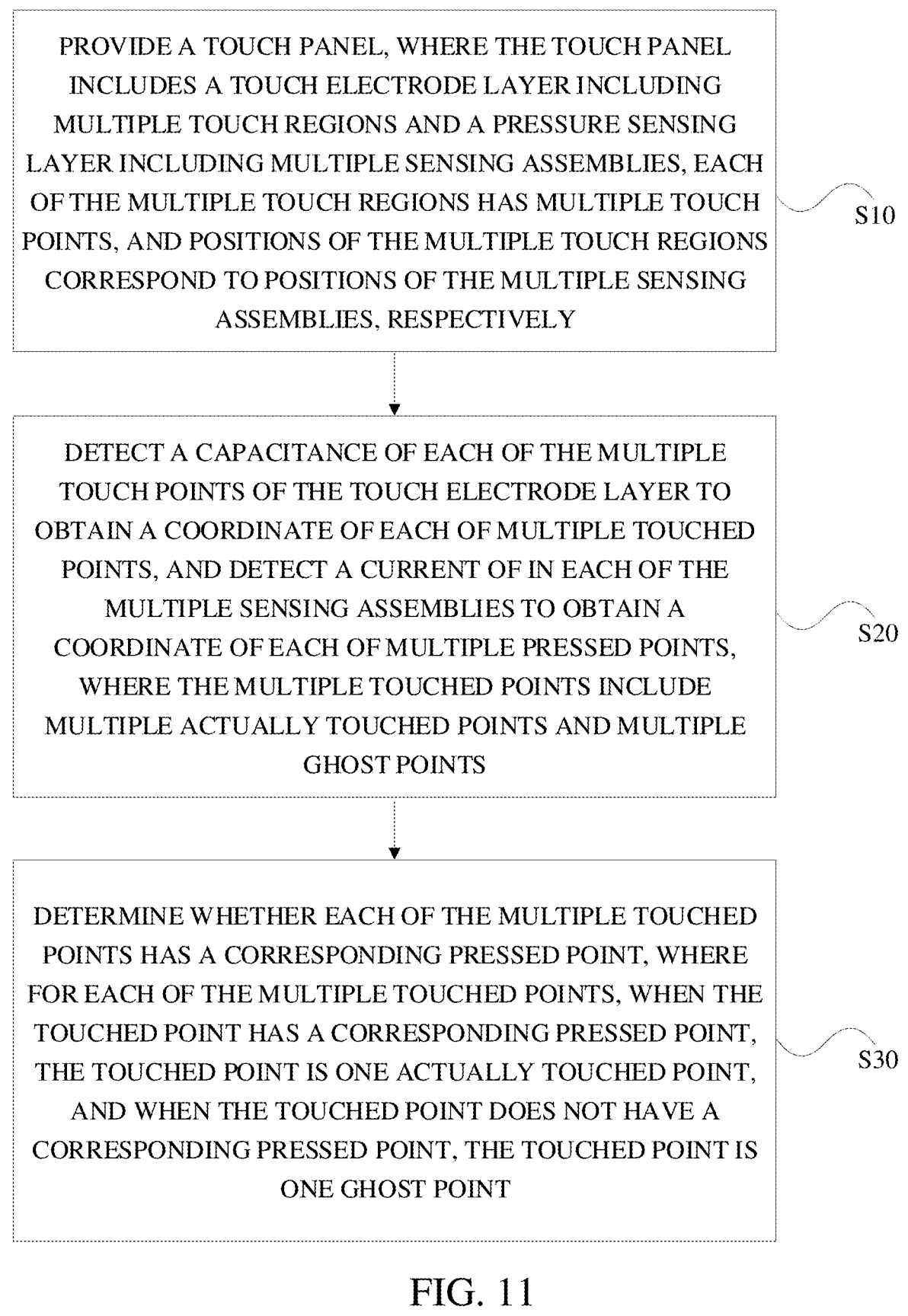

PROVIDE A TOUCH PANEL, WHERE THE TOUCH PANEL INCLUDES A TOUCH ELECTRODE LAYER INCLUDING MULTIPLE TOUCH REGIONS AND A PRESSURE SENSING LAYER INCLUDING MULTIPLE SENSING ASSEMBLIES, EACH OF THE MULTIPLE TOUCH REGIONS HAS MULTIPLE TOUCH POINTS, AND POSITIONS OF THE MULTIPLE TOUCH REGIONS CORRESPOND TO POSITIONS OF THE MULTIPLE SENSING ASSEMBLIES, RESPECTIVELY

S10

DETECT A CAPACITANCE OF EACH OF THE MULTIPLE TOUCH POINTS OF THE TOUCH ELECTRODE LAYER TO OBTAIN A COORDINATE OF EACH OF MULTIPLE TOUCHED POINTS, AND DETECT A CURRENT OF IN EACH OF THE MULTIPLE SENSING ASSEMBLIES TO OBTAIN A COORDINATE OF EACH OF MULTIPLE PRESSED POINTS, WHERE THE MULTIPLE TOUCHED POINTS INCLUDE MULTIPLE ACTUALLY TOUCHED POINTS AND MULTIPLE GHOST POINTS

S20

DETERMINE WHETHER EACH OF THE MULTIPLE TOUCHED POINTS HAS A CORRESPONDING PRESSED POINT, WHERE FOR EACH OF THE MULTIPLE TOUCHED POINTS, WHEN THE TOUCHED POINT HAS A CORRESPONDING PRESSED POINT, THE TOUCHED POINT IS ONE ACTUALLY TOUCHED POINT, AND WHEN THE TOUCHED POINT DOES NOT HAVE A CORRESPONDING PRESSED POINT, THE TOUCHED POINT IS ONE GHOST POINT

TOUCH PANEL, DISPLAY MODULE, AND DISPLAY DEVICE

CROSS-REFERENCE TO RELATED APPLICATIONS

This application claims priority under 35 U.S.C. § 119 (a) to Chinese Patent Application No. 202310518763.4, filed May 10, 2023, the entire disclosure of which is incorporated herein by reference.

TECHNICAL FIELD

This disclosure relates to the field of display technology, and in particular, to a touch panel, a display module with the touch panel, and a display device with the display module.

BACKGROUND

With the touchscreen technology, people can operate electronic devices more easily and conveniently, achieving good man-machine interaction. With the development of touchscreen industry, touch display panels are used in almost all electronic devices such as smart phones, tablet computers, and smart watches. At present, capacitive touch panels are the most common in daily life due to their relatively good light transmittance and definition, and self-capacitive touch panels are especially common in electronic devices.

The self-capacitive touch panel includes multiple touch points, and each touch point corresponds to a horizontal coordinate and a vertical coordinate. However, in practical applications, when multi-touch occurs on a touch panel, the touch panel cannot accurately recognize multiple touched points at the same time, resulting in confusion in coordinates of the multiple touched points, leading to "ghost points". The "ghost points" may significantly affect and interfere with detection of touched positions by the touch panel, leading to misjudgment of actually touched positions, thereby reducing touch effect and user experience.

In view of this, how to solve a problem of "ghost points" generated due to confusion in coordinates of touched points when multi-touch occurs on the self-capacitive touch panel in the related art is an urgent problem to-be-solved for those skilled in the art.

SUMMARY

A touch panel, a display module with the touch panel, and a display device with the display module are provided in the disclosure.

A touch panel is provided in the disclosure. The touch panel includes a touch electrode layer. The touch electrode layer includes multiple touch regions. The touch panel further includes a pressure sensing layer. The pressure sensing layer includes multiple sensing assemblies. Positions of the multiple sensing assemblies correspond to positions of the multiple touch regions, respectively. The touch electrode layer is configured to sense multiple touched points. The multiple touched points include at least two actually touched points. The multiple sensing assemblies are configured to sense pressed points. Each of the pressed points is used to determine one touch region where one actually touched point is located.

A display module is further provided in the disclosure. The display module includes a display panel and the touch panel. The touch panel is disposed at a light-exiting side of the display panel.

A display device is further provided in the disclosure. The display device includes a driver and the display module. The driver is electrically connected to the display module and configured to control the display module to perform image display.

BRIEF DESCRIPTION OF THE DRAWINGS

In order to describe technical solutions in embodiments of the disclosure more clearly, the following will give a brief introduction to accompanying drawings required for describing embodiments. Apparently, the accompanying drawings hereinafter described illustrate some embodiments of the disclosure. Based on these drawings, those of ordinary skills in the art can also obtain other drawings without creative effort.

FIG. 2 is a schematic top structural view of a touch electrode layer of the touch panel in FIG. 1.

FIG. 4 is a schematic top structural view of a pressure sensing layer of the touch panel in FIG. 1.

FIG. 11 is a schematic flow chart of a touch detection method provided in embodiments of the disclosure.

Figure 1:
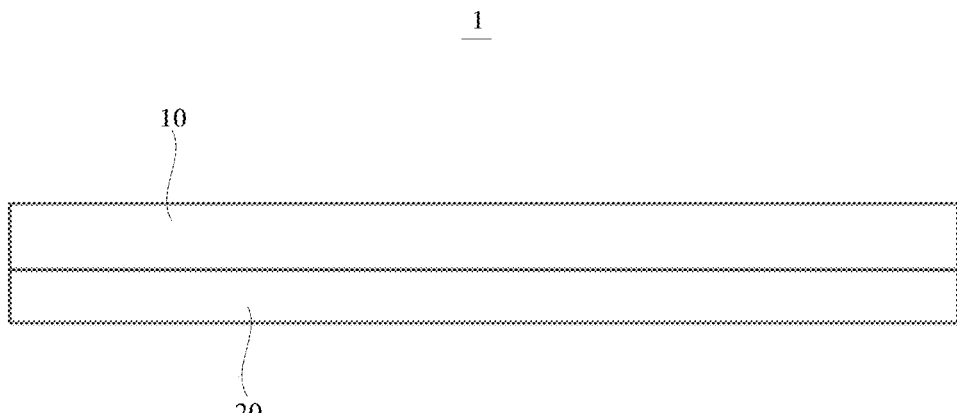
FIG. 1 is a schematic structural view of layers of a touch panel provided in embodiments of the disclosure.

Illustration of reference signs in the accompanying drawings 1—touch panel; 10—touch electrode layer; 10a—touch region; 11—touch point; 20—pressure sensing layer; 21—sensing assembly; 40—coordinate detection unit; 50—pressure detection unit; 60—comparison unit; 210—flexible element; 211—base; 212—protrusion; 220—conductive element; 300—display panel; 400—display module; 500—driver; 600—display device; S10-S30—operations of a touch detection method.

DETAILED DESCRIPTION

In order to facilitate understanding of the disclosure, a detailed description will be given with reference to relevant accompanying drawings. The accompanying drawings illustrate some exemplary embodiments of the disclosure. However, the disclosure can be implemented in many different forms and is not limited to the embodiments described herein. On the contrary, these embodiments are provided for a more thorough and comprehensive understanding of the disclosure.

Illustration of the following embodiments is provided with reference to the accompanying drawings to exemplarily illustrate specific embodiments that can be implemented in the disclosure. Sequence numbers for components recited herein, such as "first", "second", etc., are used merely to distinguish described objects and do not have any sequence or technical meaning. The terms "connecting" and "coupling" in the disclosure, unless specified otherwise, both include direct connection and indirect connection (coupling). In the disclosure, directional terms mentioned herein, such as "on", "under", "front", "back", "left", "right", "in", "out", "side", etc., indicate only directions with reference to the accompanying drawings, and the directional terms used are for better and clearer illustration and understanding of the disclosure, rather than explicitly or implicitly indicate that apparatuses or elements referred to herein must have a certain orientation or be configured and operated in a specific orientation and therefore cannot be understood as limitations to the disclosure.

In illustration of the disclosure, it needs to be noted that, unless stated otherwise, terms "installing", "coupling", and "connecting" referred to herein can be understood in broader sense. For example, they may include a fixed coupling, a removable coupling, or an integrated coupling; they may include a mechanical coupling; they may include a direct coupling, an indirect coupling through a medium, or an interconnection between two components. For those of ordinary skill in the art, the above terms in the disclosure can be understood according to specific situations. It needs to be noted that the terms "first", "second", and the like used in the specification, the claims, and the accompany drawings of the disclosure are used to distinguish different objects rather than describe a particular order.

In addition, the term "include", "may include", "contain", or "may include" used herein indicates the existence of a corresponding function, operation, element, or the like disclosed, and does not limit one or more other functions, operations, elements, etc. In addition, the term "includes" or "including" means that there are corresponding features, numbers, steps, operations, elements, components, or a combination thereof disclosed in the specification, and does not exclude the existence or addition of one or more other features, numbers, steps, operations, elements, components, or a combination thereof, which is intended to cover a non-exclusive inclusion. In addition, when describing embodiments of the disclosure, "can" or "may" is used to mean "one or more embodiments of the disclosure". Furthermore, the term "exemplary" is intended to mean exemplary or illustrative.

Unless otherwise defined, all technical and scientific terms used herein have the same meaning as commonly understood by those skilled in the art of the disclosure. The terms used herein in the disclosure are for the purpose of describing implementations only and are not intended to limit the disclosure.

Referring to FIG. 1, FIG. 1 is a schematic structural view of layers of a touch panel provided in embodiments of the disclosure. The touch panel 1 provided in embodiments of the disclosure includes a touch electrode layer 10 and a pressure sensing layer 20 that are stacked together. The touch electrode layer 10 is configured to sense touched points, and the pressure sensing layer 20 is configured to sense pressed points.

Figure 3:
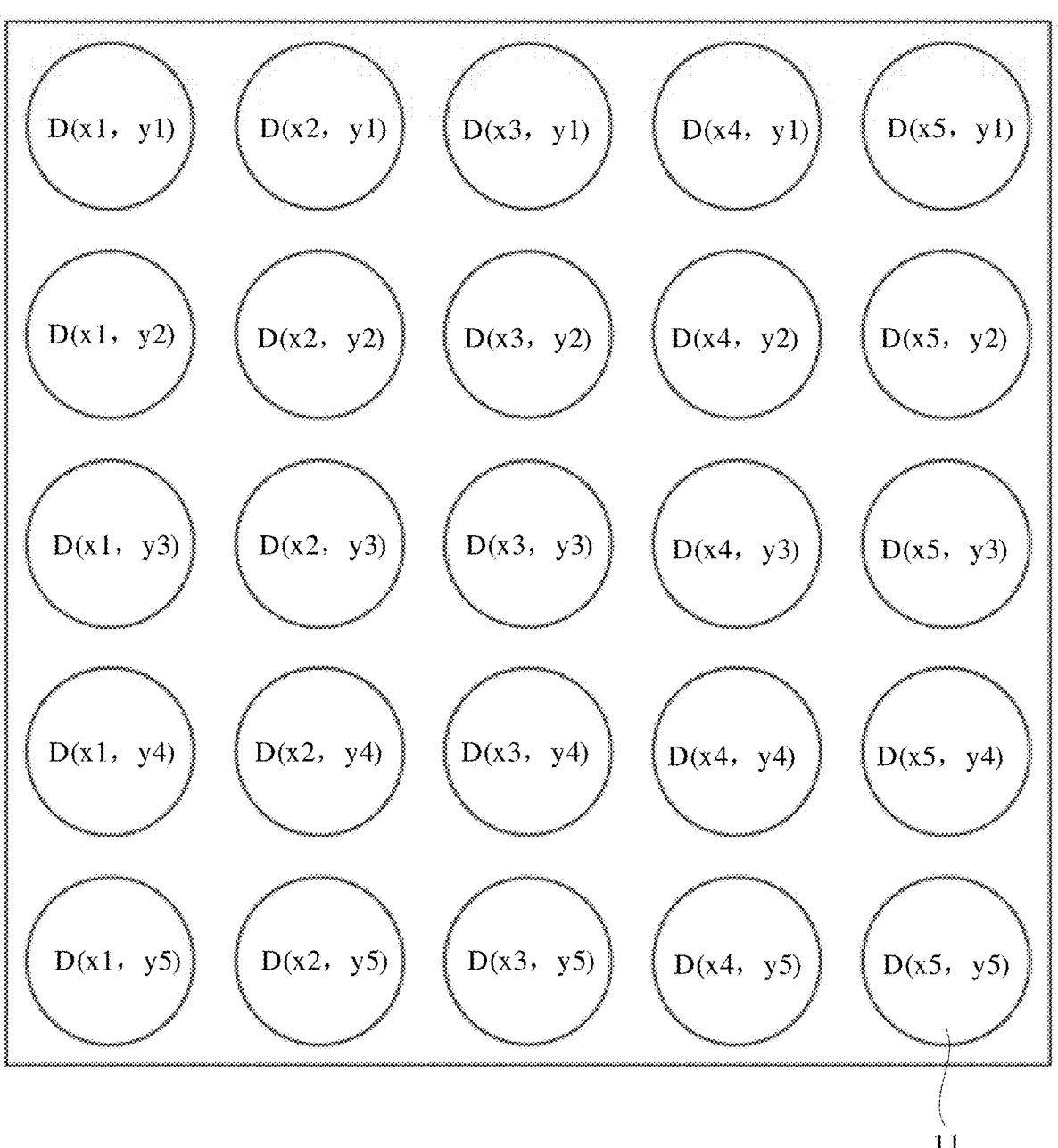
FIG. 3 is a schematic structural view of a touch region of the touch panel in FIG. 2.

In embodiments of the disclosure, referring to FIG. 2, FIG. 2 is a schematic top structural view of a touch electrode layer of the touch panel in FIG. 1. The touch electrode layer 10 includes multiple touch regions 10a, where the multiple touch regions 10a are arranged in an array, that is, the multiple touch regions 10a are arranged in multiple rows and multiple columns. Referring to FIG. 3, FIG. 3 is a schematic structural view of the touch region of the touch panel in FIG. 2. Each touch region 10a includes multiple touch points 11, where the multiple touch points 11 are arranged in an array, that is, the multiple touch regions 10a are arranged in multiple rows and multiple columns.

In embodiments of the disclosure, referring to FIG. 4, FIG. 4 is a schematic top structural view of a pressure sensing layer of the touch panel in FIG. 1. The pressure sensing layer 20 includes multiple sensing assemblies 21, where the multiple sensing assemblies 21 are arranged in an array, that is, the multiple sensing assemblies 21 are arranged in multiple rows and multiple columns. Positions of the multiple sensing assemblies 21 correspond to positions of the multiple touch regions 10a, respectively, that is, each touch region 10a is disposed above a corresponding sensing assembly 21. When the touch panel 1 is touched, at least one touched point is sensed by the touch electrode layer 10. The at least one touched point includes one actually touched point (i.e., one touch point that is actually touched). Alternatively, the at least one touched point includes multiple actually touched points and multiple ghost points (the ghost point refers to a touched point that is sensed by the touch electrode layer 10 but is not actually touched), that is, multiple touched points include at least two actually touched points. When there are two actually touched points, the multiple touched points include two actually touched points and at least one ghost point. The multiple sensing assemblies 21 are configured to sense pressed points (i.e., points that are pressed). Each pressed point is used to determine one touch region 10a where one actually touched point is located, that is, a position of each actually touched point can be determined according to one pressed point. Each pressed point coincides with one actually touched point in a thickness direction of the touch panel 1.

It can be understood that, there may be two cases: a single touch point 11 is touched (i.e., single-touch) or multiple touch points 11 are touched (i.e., multi-touch). In the case of single-touch, one touched point is sensed by the touch electrode layer 10, and the touched point is one actually touched point, so that the touch electrode layer 10 can directly determine a position of the actually touched point. In the case of multi-touch, multiple touched points are sensed by the touch electrode layer 10, where the multiple touched points may include multiple actually touched points and multiple ghost points, and positions of the multiple actually touched points and positions of the multiple ghost points are unclear. In this case, the multiple sensing assemblies 21 can sense pressed points, and accordingly the positions of the multiple actually touched points can be determined, and thus whether each touched point is one actually touched point or one ghost point can be determined, thereby preventing the touch panel 1 from sensing the ghost points, and thus improving touch effect and user experience.

Specifically, for ease of illustration, different touch regions 10a are defined with horizontal and vertical coordinates. Referring to FIG. 2, Z (m, n) represents a touch region, where m is a horizontal coordinate and n is a vertical coordinate. Different touch points 11 are defined with horizontal coordinates and vertical coordinates. Referring to FIG. 3, D (x, y) represents a touch point, where x is a horizontal coordinate and y is a vertical coordinate. Different sensing assemblies 21 are defined with horizontal coordinates and vertical coordinates. Referring to FIG. 4, P (a, b) represents a sensing assembly 21, where a is a horizontal coordinate, and b is a vertical coordinate. Coordinates of the touch regions Z (m, n) are in one-to-one correspondence with coordinates of the sensing assemblies P (a, b), i.e., positions of the sensing assemblies 21 are in one-to-one correspondence with positions of the touch regions 10a. For example, a touch region Z (m1, n1) corresponds to a sensing assembly P (a1, b1), and a touch region Z (m4, n5) corresponds to a sensing assembly P (a4, b5). In the case of multi-touch, four touched points are sensed by the touch electrode layer 10. For example, the four touched points may be in the touch region Z (m1 n1), a touch region Z (m5, n1), a touch region Z (m1, n5), and a touch region Z (m5, n5), respectively, where any two touch regions are regions where actually touched points are located, and the other two touch regions are regions where ghost points are located. However, the touch electrode layer 10 does not know which two of the four touched points are actually touched points and which two of the four touched points are ghost points. In the case where the sensing assembly P (a1, b1) of the pressure sensing layer 20 senses a pressed point and a sensing assembly P (a5, b5) of the pressure sensing layer 20 senses a pressed point, it can be determined that a touched point in the touch region Z (m1, n1) and a touched point in the touch region Z (m5, n5) are actually touched points, and a touched point in the touch region Z (m5, n1) and a touched point in the touch region Z (m1, n5) are ghost points.

In exemplary embodiments, the number of touch points D (x, y) in each touch region Z (m, n) may range from 4 to 100, for example, may be 4, 16, 25, 80, 100, etc., which is not specifically limited in the disclosure. For example, Z (m1, n1) is formed by lines connecting D (x1, y1), D (x10, y1), D (x1, y10), and D (x10, y10), and Z (m2, n1) is formed by lines connecting D (x11, y1), D (x20, y1), D (x11, y10), and D (x20, y10).

In exemplary embodiments, an area of the touch region Z (m, n) is necessarily smaller than a contact area between a finger and the touch electrode layer 10, that is, the touched points correspond to multiple touch regions Z (m, n). Therefore, in the case of multi-touch, the multiple touched points are not located in the same touch region Z (m, n).

In exemplary embodiments, the touch electrode layer 10 may further include multiple touch electrodes (not illustrated) and a common electrode. The multiple touch electrodes are disposed at one side of the common electrode. Each touch electrode corresponds to one touch point 11, and each touch electrode and the common electrode form an equivalent capacitor. When the touch electrode layer 10 is touched by a finger, a coupling capacitor is formed between the finger and one touch electrode, and the coupling capacitor is connected in parallel with the equivalent capacitor, so that a capacitance of the touch electrode touched increases. The touch electrode with an increased capacitance can be detected, and accordingly a coordinate of the touch electrode touched can be obtained, that is, a coordinate of a touch point touched can be obtained.

In exemplary embodiments, multiple touch electrodes may correspond to one touched point.

In exemplary embodiments, the finger is in direct contact with the touch electrode layer 10 rather than in contact with the sensing assembly 21. Since the sensing assembly 21 may also be energized, an interference capacitor may be formed in the case where the finger is in direct contact with the sensing assembly 21. The interference capacitor may affect the capacitance of the touch electrode of the touch electrode layer 10, so that the touch electrode layer 10 cannot accurately sense the touched point. The sensing assembly 21 can sense the touched point by sensing pressure, and even when the sensing assembly 21 is spaced apart from pressure by the touch electrode layer 10, the pressure can be accurately transferred to the sensing assembly 21. Therefore, the touch electrode layer 10 has no impact on sensing sensitivity of the sensing assembly 21.

In exemplary embodiments, a shape of the touch electrode may be a quadrangle, for example, a rectangle, a rhombus, etc. A side length of the touch electrode may range from 0.03 mm to 3 mm, for example, may be 0.03 mm, 0.1 mm, 0.5 mm, 1.2 mm, 2 mm, 2.5 mm, 3 mm, etc., and a size of the touch electrode may be specifically set according to touch precision, which is not specifically limited in the disclosure.

In exemplary embodiments, the touch electrode may be made of Indium Tin Oxide (ITO). The touch panel 1 is mainly applicable to an electronic device having a display function, and since ITO has relatively good transparency, the touch panel 1 can allow light emitted by the electronic device to pass through.

In conclusion, the touch panel 1 provided in embodiments of the disclosure includes the touch electrode layer 10 and the pressure sensing layer 20. The touch electrode layer 10 includes the multiple touch regions 10a, and the pressure sensing layer 20 includes the multiple sensing assemblies 21. Positions of the multiple sensing assemblies 21 are in one-to-one correspondence with positions of the multiple touch regions 10a. The touch electrode layer 10 is configured to sense multiple touched points. The multiple touched points include multiple actually touched points and multiple ghost points. The multiple sensing assemblies 21 are configured to sense pressed points. Each of the pressed points is used to determine a position of one actually touched point, so that whether each touched point is one actually touched point or one ghost point can be determined, thereby preventing the touch panel 1 from sensing the ghost points, and thus improving touch effect and user experience. Moreover, the position of the actually touched point is determined by the touch electrode layer 10 and the pressure sensing layer 20, and thus an existing touch electrode layer can be used in the touch panel 1, and there is no need to arrange too many sensing assemblies 21 in the pressure sensing layer 20, thereby avoiding too complex peripheral circuits electrically connected to the sensing assemblies 21, resulting in cost savings in manufacturing.

Figure 5:
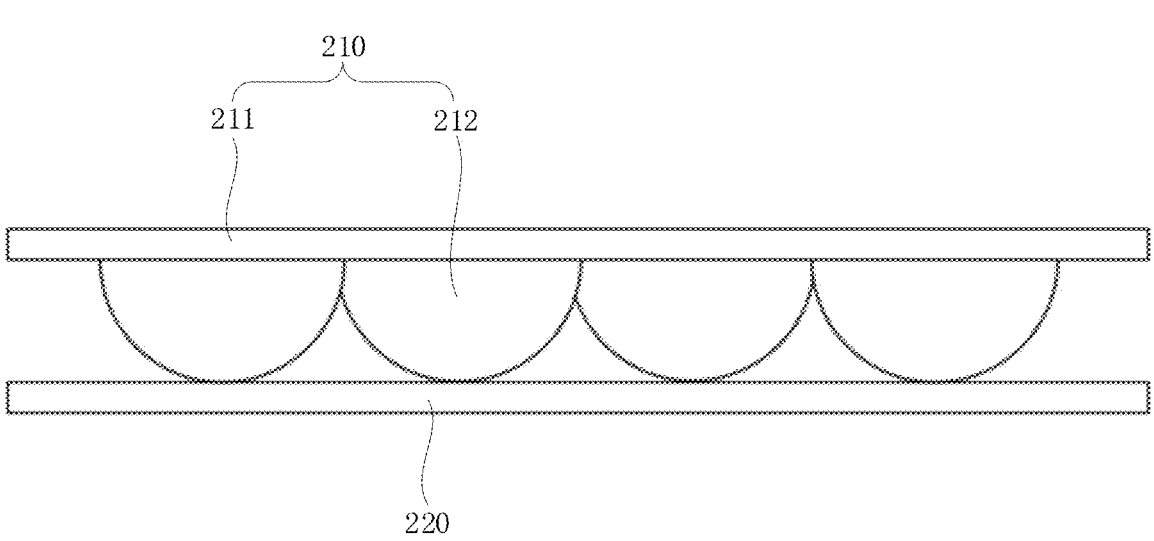
FIG. 5 is a schematic structural view of a sensing assembly in a non-pressed state provided in embodiments of the disclosure.
Figure 6:
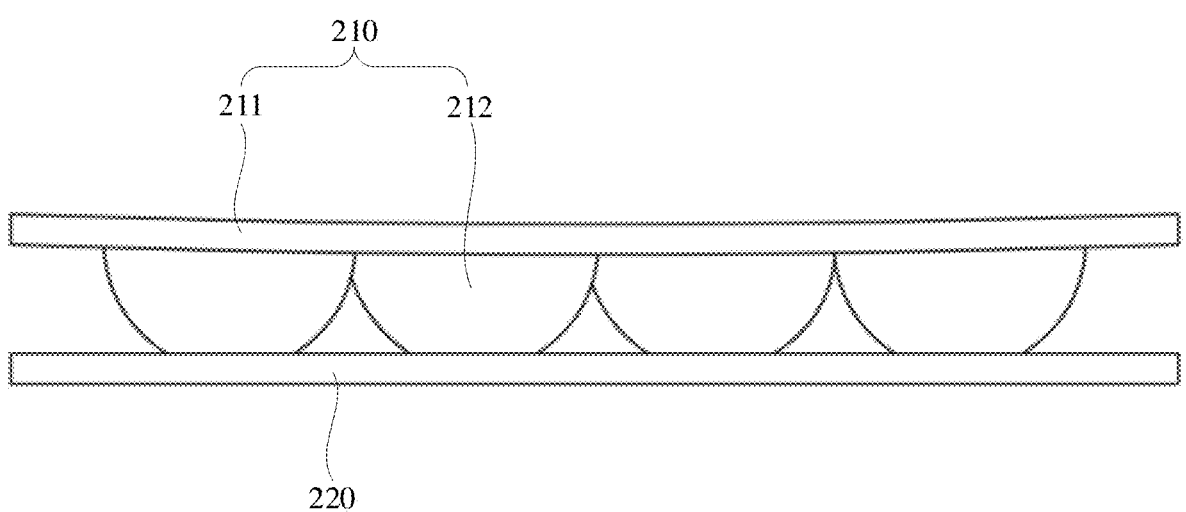
FIG. 6 is a schematic structural view of a sensing assembly in a pressed state provided in embodiments of the disclosure.

In embodiments of the disclosure, referring to FIG. 5 and FIG. 6, FIG. 5 is a schematic structural view of a sensing assembly in a non-pressed state provided in embodiments of the disclosure, and FIG. 6 is a schematic structural view of a sensing assembly in a pressed state provided in embodiments of the disclosure. Each of the sensing assemblies 21 includes a flexible element 210 and a conductive element 220. The conductive element 220 is connected to one side of the flexible element 210 and in conduction connection with the flexible element 210, that is, the flexible element 210 is electrically connected to the conductive element 220. When the flexible element 210 is touched, the flexible element 210 deforms, a contact area between the flexible element 210 and the conductive element 220 increases, and a resistance of the sensing assembly 21 decreases.

In exemplary embodiments, when the flexible element 210 is not touched, the flexible element 210 restores to an original state, the contact area between the flexible element 210 and the conductive element 220 decreases, and the resistance of the sensing assembly 21 increases.

In exemplary embodiments, the flexible element 210 may be connected to a positive electrode of a power supply, and the conductive element 220 may be connected to a negative electrode of the power supply, so that the flexible element 210 is in conduction connection with the conductive element 220. Alternatively, the flexible element 210 may be connected to a negative electrode of the power supply, and the conductive element 220 may be connected to a positive electrode of the power supply, so that the flexible element 210 is in conduction connection with the conductive element 220. When the resistance of the sensing assembly 21 changes, a current in the sensing assembly 21 changes.

In exemplary embodiments, the flexible element 210 is connected to one side of the touch electrode layer 10, and the conductive element 220 is connected to one side of the flexible element 210 away from the touch electrode layer 10.

It can be understood that, the flexible element 210 is in direct contact with the touch electrode layer 10, and when the touch electrode layer 10 is touched, a touched portion of the touch electrode layer 10 deforms to a certain degree, and thus the flexible element 210 deforms.

In exemplary embodiments, the flexible element 210 may be made of polydimethylsiloxane, and the conductive element 220 may be made of polyaniline.

It can be understood that polydimethylsiloxane has an excellent flexibility and excellent deformation. Polydimethylsiloxane can deform under very small pressure, and can restore to an original state quickly when the pressure is removed. Polyaniline has good conductivity and chemical stability. By testing each sensing assembly 21 of the disclosure, the following can be obtained. A pressure that can be sensed by each sensing assembly 21 ranges from 1 mg to 1500 g, a response time of each sensing assembly 21 is less than 50 ms, and a recovery time of each flexible element 210 of the sensing assembly 21 after deformation is less than 60 ms, so that the sensing assembly 21 can quickly sense a slight touch and has relatively high sensitivity.

In embodiments of the disclosure, referring to FIG. 5 and FIG. 6, the flexible element 210 may include a base 211 and multiple protrusions 212. The base 211 is disposed opposite to and spaced apart from the conductive element 220. The multiple protrusions 212 are connected between the base 211 and the conductive element 220, that is, one end of each of the multiple protrusions 212 is fixed to the base 211, and the other opposite end of each of the multiple protrusions 212 is in contact with the conductive element 220. That is, the multiple protrusions 212 are connected to one side of the base 211 facing the conductive element 220 and are in contact with the conductive element 220. As illustrated in FIG. 6, when the base 211 is touched, the base 211 deforms, and the multiple protrusions 212 are moved towards the conductive element 220. Since the conductive element 220 abuts against the multiple protrusions 212, the multiple protrusions 212 deform, a contact area between each of the multiple protrusions 212 and the conductive element 220 increases, and the resistance of the sensing assembly 21 decreases.

It can be understood that, in the case where the contact area between each of the multiple protrusions 212 and the conductive element 220 increases, an area through which a current flows increases, thereby decreasing the resistance of the sensing assembly 21.

In embodiments of the disclosure, a cross-sectional area of each of the multiple protrusions 212 gradually decreases in a direction from the base 211 to the conductive element 220, so that when the multiple protrusion 212 are moved towards the conductive element 220, the contact area between each of the multiple protrusion 212 and the conductive element 220 increases.

In exemplary embodiments, each protrusion 212 may be in a shape of a hemisphere or a semiellipsoid. In other embodiments, each protrusion 212 may be in a shape of a circular truncated cone, a truncated pyramid, or other shapes that can meet the same requirement, which is not specifically limited in the disclosure.

In exemplary embodiments, a height of each protrusion 212 may range from 8 μm to 30 μm, for example, may be 8 μm, 10 μm, 15 μm, 18 μm, 21 μm, 25 μm, 30 μm, or any other numerical values, which is not specifically limited in the disclosure.

In exemplary embodiments, a diameter of the bottom of each protrusion 212 may range from 10 μm to 30 μm, for example, may be 10 μm, 12 μm, 15 μm, 19 μm, 20 μm, 24 μm, 30 μm, or any other numerical values, which is not specifically limited in the disclosure.

In exemplary embodiments, the conductive element 220 may be a thin film and a thickness of the conductive element 220 may range from 100 nm to 300 nm, for example, may be 100 nm, 150 nm, 180 nm, 200 nm, 250 nm, 270 nm, 300 nm, or other numerical values, which is not specifically limited in the disclosure.

Figure 7:
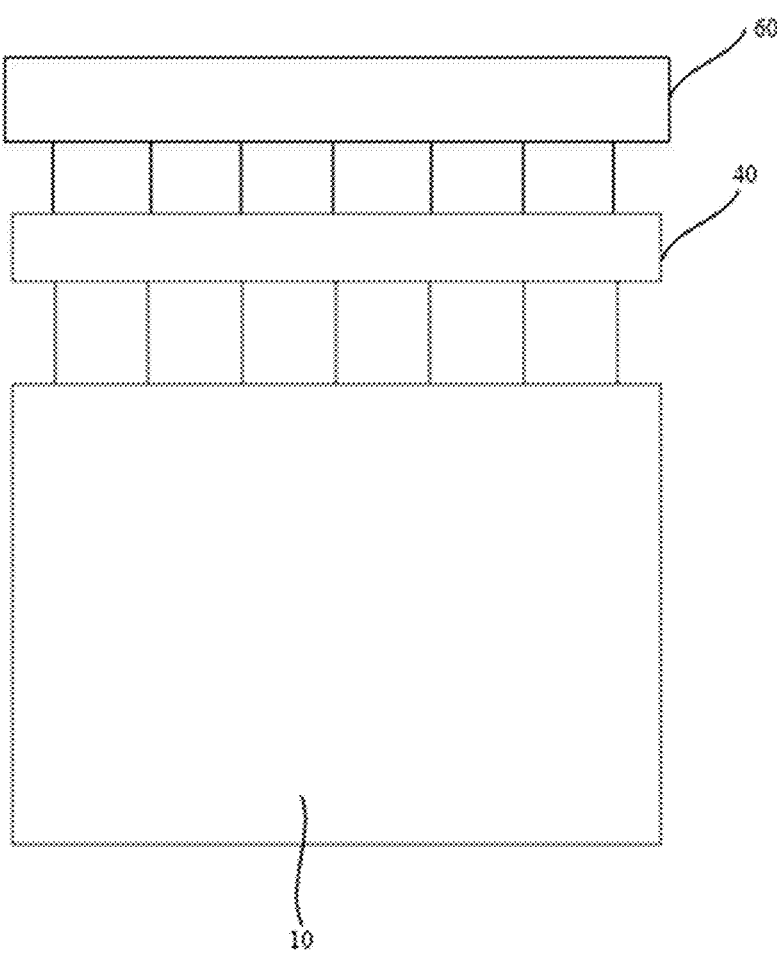
FIG. 7 is a schematic structural view of a coordinate detection unit and a touch electrode layer provided in embodiments of the disclosure.

In embodiments of the disclosure, referring to FIG. 7, FIG. 7 is a schematic structural view of a coordinate detection unit and a touch electrode layer provided in embodiments of the disclosure. The touch panel 1 may further include a coordinate detection unit 40 electrically connected to the touch electrode layer 10. The coordinate detection unit 40 is configured to detect a capacitance of each of the multiple touch points to obtain a coordinate of each of the multiple touched points, and is configured to output a coordinate signal of each of the multiple touched points to a comparison unit 60.

In exemplary embodiments, the coordinate detection unit 40 is electrically connected to each of the touch electrodes of the touch electrode layer 10.

Figure 8:
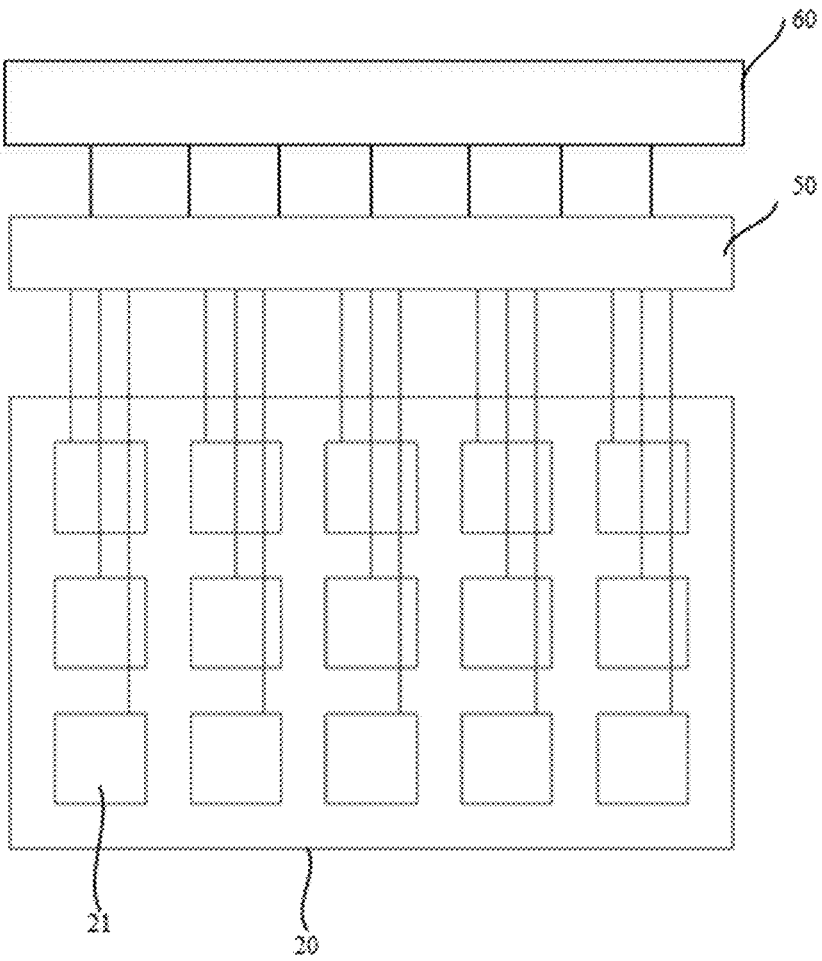
FIG. 8 is a schematic structural view of a pressure detection unit and a pressure sensing layer provided in embodiments of the disclosure.

In embodiments of the disclosure, referring to FIG. 8, FIG. 8 is a schematic structural view of a pressure detection unit and a pressure sensing layer provided in embodiments of the disclosure. The touch panel 1 may further include a pressure detection unit 50. The pressure detection unit 50 is electrically connected to each of the multiple sensing assemblies 21 of the pressure sensing layer 20. The pressure detection unit 50 is configured to detect a current in each of the multiple sensing assemblies 21 to obtain a coordinate of each of the pressed points, and is configured to output a coordinate signal of each of the pressed points to the comparison unit 60.

In exemplary embodiments, the coordinate detection unit 40 and the pressure detection unit 50 may be integrated in a flash memory.

In the embodiment of the disclosure, the touch panel 1 may further include the comparison unit 60. The comparison unit 60 is electrically connected to both the coordinate detection unit 40 and the pressure detection unit 50. The comparison unit 60 is configured to receive the coordinate signal of each of the multiple touched points from the coordinate detection unit 40 and the coordinate signal of each of the pressed points from the pressure detection unit 50, and determine whether each of the multiple touched points has a corresponding pressed point according to the coordinate signal of each of the multiple touched points and the coordinate signal of each of the pressed points. For each of the multiple touched points, when the touched point has a corresponding pressed point, the touched point is one actually touched point, and when the touched point does not have a corresponding pressed point, the touched point is one ghost point. The comparison unit 60 is further configured to output a coordinate signal of each of the multiple actually touched points to a driver 500 (see FIG. 10).

In exemplary embodiments, the comparison unit 60 is implemented by a controller of the touch panel, for example, a Timer Control Register (Tcon) of the touch panel.

In conclusion, the touch panel 1 provided in embodiments of the disclosure includes the touch electrode layer 10. The touch electrode layer 10 includes the multiple touch regions 10a. The touch panel 1 further includes the pressure sensing layer 20. The pressure sensing layer 20 includes the multiple sensing assemblies 21. Positions of the multiple sensing assemblies 21 correspond to positions of the multiple touch regions 10a, respectively. The touch electrode layer 10 is configured to sense multiple touched points. The multiple touched points include multiple actually touched points and multiple ghost points. The multiple sensing assemblies 21 are configured to sense pressed points. Each of the pressed points is used to determine a position of one actually touched point, so that whether each touched point is one actually touched point or one ghost point can be determined, thereby preventing the touch panel 1 from sensing the ghost points, and thus improving touch effect and user experience.

Figure 9:
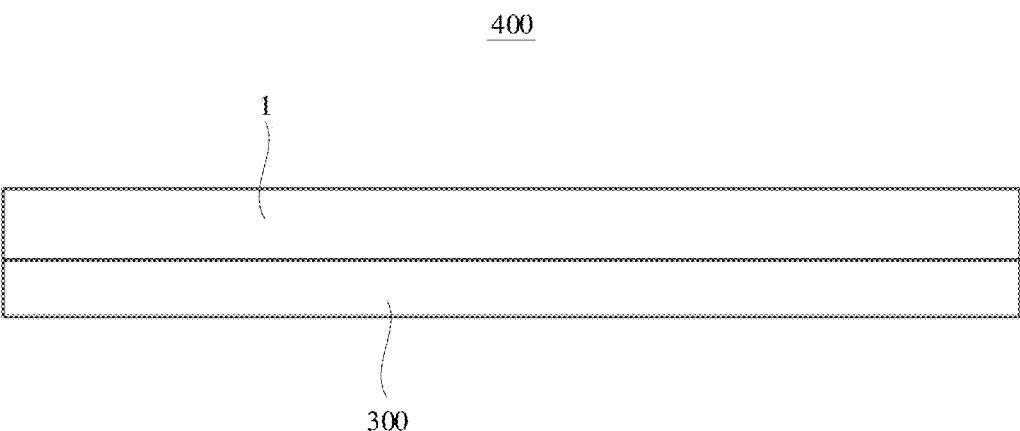
FIG. 9 is a schematic structural view of layers of a display module provided in embodiments of the disclosure.

Based on the same inventive concept, a display module is further provided in embodiments of the disclosure. Referring to FIG. 9, FIG. 9 is a schematic structural view of layers of a display module provided in embodiments of the disclosure. The display module 400 includes a display panel 300 and the touch panel 1. The touch panel 1 is disposed at a light-exiting side of the display panel 300. The touch panel 1 has been described in detail in the embodiments illustrated in FIGS. 1 to 8, which will not be repeated herein.

In exemplary embodiments, the display panel 300 may be a Liquid Crystal Display (LCD) panel, an Organic Light-Emitting Diode (OLED) display panel, or a micro Light-Emitting Diode (LED) display panel, which is not specifically limited in the disclosure.

In conclusion, the display module 400 provided in embodiments of the disclosure includes the display panel 300 and the touch panel 1. The touch panel 1 includes the touch electrode layer 10 and the pressure sensing layer 20. The touch electrode layer 10 includes the multiple touch regions 10a. The pressure sensing layer 20 includes the multiple sensing assemblies 21. Positions of the multiple sensing assemblies 21 correspond to positions of the multiple touch regions 10a, respectively. The touch electrode layer 10 is configured to sense multiple touched points. The multiple touched points include multiple actually touched points and multiple ghost points. The multiple sensing assemblies 21 are configured to sense pressed points. Each of the pressed points is used to determine a position of one actually touched point, so that whether each touched point is one actually touched point or one ghost point can be determined, thereby preventing the touch panel 1 from sensing the ghost points, and thus improving touch effect and user experience.

Figure 10:
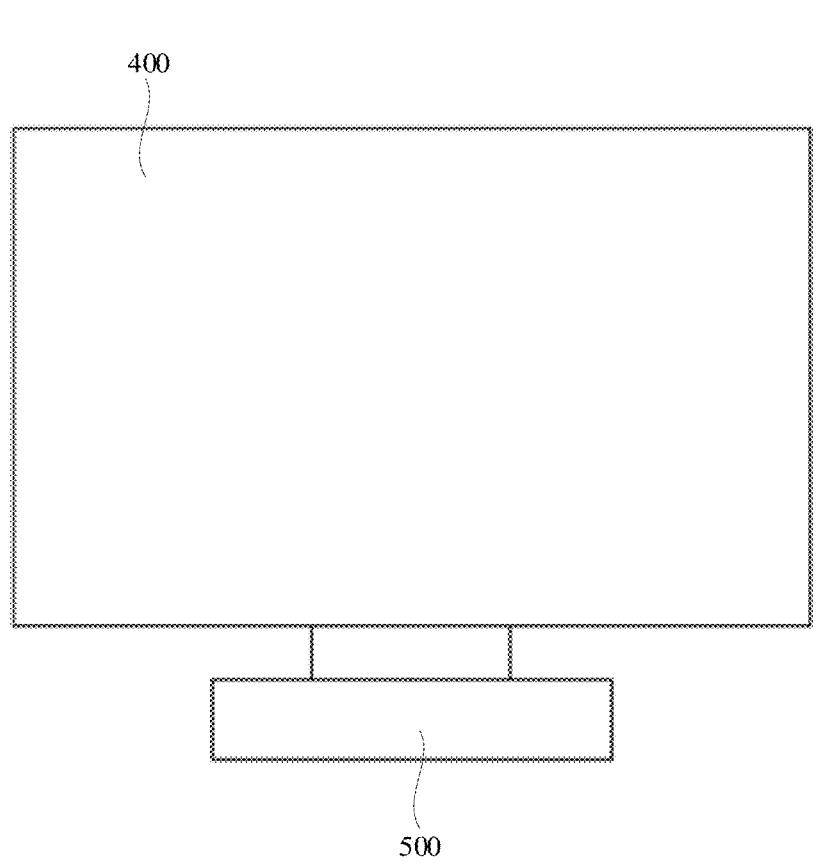
FIG. 10 is a schematic structural view of a display device provided in embodiments of the disclosure.

Based on the same inventive concept, a display device is further provided in embodiments of the disclosure. Referring to FIG. 10, FIG. 10 is a schematic structural view of a display device provided in embodiments of the disclosure. The display device 600 includes the driver 500 and the display module 400. The driver 500 is electrically connected to the display module 400 and configured to transmit a control signal to the display module 400, that is, the driver 500 is configured to drive the display module 400 to perform image display. The display module 400 has been described in detail in the embodiments illustrated in FIG. 9, which will not be repeated herein.

In embodiments of the disclosure, the driver 500 may be electrically connected to both the display panel 300 and the comparison unit 60 of the touch panel 1. The driver 500 is configured to receive the coordinate signal of each of the multiple actually touched points, and control the display panel 300 to display a corresponding image according to the coordinate signal of each of the multiple actually touched points.

It can be understood that, the display device 600 is applicable to an electronic device including, but not limited to, a television, a tablet computer, a notebook computer, a desktop computer, a mobile phone, a vehicle-mounted display, a smart watch, a smart bracelet, and smart glasses. According to embodiments of the disclosure, a specific type of the display device 600 is not particularly limited, and the display device 600 may be correspondingly designed by those skilled in the art according to specific use requirements of the display device 600, which will not be repeated herein.

In exemplary embodiments, the display device 600 may further include a power-supply board, a high-voltage board, a key control board, or other necessary members and components. Those skilled in the art can perform corresponding supplement according to the specific type and actual functions of the display device 600, which will not be repeated herein.

In conclusion, the display device 600 provided in embodiments of the disclosure includes the driver 500 and the display module 400. The display module 400 includes the display panel 300 and the touch panel 1. The touch panel 1 includes the touch electrode layer 10. The touch electrode layer 10 includes the multiple touch regions 10a. The touch panel 1 further includes the pressure sensing layer 20. The pressure sensing layer 20 includes the multiple sensing assemblies 21. Positions of the multiple sensing assemblies 21 are in one-to-one correspondence with positions of the multiple touch regions 10a. The touch electrode layer 10 is configured to sense multiple touched points. The multiple touched points include multiple actually touched points and multiple ghost points. The multiple sensing assemblies 21 are configured to sense pressed points. Each of the pressed points is used to determine a position of one actually touched point, so that whether each touched point is one actually touched point or one ghost point can be determined, thereby preventing the touch panel 1 from sensing the ghost points, and thus improving touch effect and user experience.

Based on the same inventive concept, a touch detection method is further provided in embodiments of the disclosure. The touch detection method is performed by the touch panel 1. For the same content between the touch detection method and the touch panel 1, reference can be made to the illustration of the touch panel 1 in the embodiments illustrated in FIGS. 1 to 8, which will not be repeated herein. Referring to FIG. 11, FIG. 11 is a schematic flow chart illustrating a touch detection method provided in embodiments of the disclosure. The touch detection method includes the following.

At S10, provide a touch panel 1. The touch panel 1 includes a touch electrode layer 10 including multiple touch regions 10a and a pressure sensing layer 20 including multiple sensing assemblies 21. Each of the multiple touch regions 10a has multiple touch points 11. Positions of the multiple touch regions 10a correspond to positions of the multiple sensing assemblies 21, respectively.

In exemplary embodiments, the touch electrode layer 10 is disposed at one side of the pressure sensing layer 20. The multiple touch regions 10a are arranged in an array, the multiple touch points 11 are arranged in an array, and the multiple sensing assemblies 21 are arranged in an array. The positions of the multiple touch regions 10a are in one-to-one correspondence with the positions of the multiple sensing assemblies 21, and each of the touch regions 10a coincides with one of the sensing assemblies 21.

At S20, detect a capacitance of each of the multiple touch points 11 of the touch electrode layer 10 to obtain a coordinate of each of multiple touched points, and detect a current in each of the multiple sensing assemblies 21 to obtain a coordinate of each of pressed points. The multiple touched points include multiple actually touched points and multiple ghost points.

Specifically, the touch panel 1 may further include a coordinate detection unit 40 and a pressure detection unit 50. The coordinate detection unit 40 is electrically connected to the touch electrode layer 10, and the pressure detection unit 50 is electrically connected to each of the multiple sensing assemblies 21 of the pressure sensing layer 20. The coordinate detection unit 40 is configured to detect a capacitance of each of the multiple touch points 11 of the touch electrode layer 10 to obtain a coordinate of each of the multiple touched points, and the pressure detection unit 50 is configured to detect a current in each of the multiple sensing assemblies 21 to obtain a coordinate of each of pressed points.

At S30, determine whether each of the multiple touched points has a corresponding pressed point. For each of the multiple touched points, when the touched point has a corresponding pressed point, the touched point is one actually touched point, and when the touched point does not have a corresponding pressed point, the touched point is one ghost point.

Specifically, the touch panel 1 may further include a comparison unit 60. The comparison unit 60 is electrically connected to both the coordinate detection unit 40 and the pressure detection unit 50. The comparison unit 60 is configured to receive the coordinate signal of each of the multiple touched points from the coordinate detection unit 40 and the coordinate signal of each of the pressed points from the pressure detection unit 50. The comparison unit 60 is configured to determine whether each of the multiple touched points has a corresponding pressed point according to the coordinate signal of each of the multiple touched points and the coordinate signal of each of the pressed points, and output a coordinate signal of each of the multiple actually touched points.

In conclusion, the touch detection method provided in embodiments of the disclosure includes the following. Provide the touch panel 1. The touch panel 1 includes the touch electrode layer 10 including the multiple touch regions 10a and the pressure sensing layer 20 including the multiple sensing assemblies 21. Each of the multiple touch regions 10a has multiple touch points 11. Positions of the multiple touch regions 10a correspond to positions of the multiple sensing assemblies 21, respectively. Detect a capacitance of each of the multiple touch points 11 of the touch electrode layer 10 to obtain a coordinate of each of multiple touched points, and detect a current in each of the multiple sensing assemblies 21 to obtain a coordinate of each of pressed points. The multiple touched points include multiple actually touched points and multiple ghost points. Determine whether each of the multiple touched points has a corresponding pressed point. For each of the multiple touched points, when the touched point has a corresponding pressed point, the touched point is one actually touched point, and when the touched point does not have a corresponding pressed point, the touched point is one ghost point. Therefore, with the touch detection method of the disclosure, positions of the multiple actually touched points can be determined through the pressed points sensed by the pressure sensing layer 20, respectively, so that whether each touched point is one actually touched point or one ghost point can be determined, thereby preventing the touch panel from sensing the ghost points, and thus improving touch effect and user experience.

The flow chart illustrated in the disclosure is merely an implementation, and there may be various modifications and changes of the steps in the figures or the disclosure without departing from the spirit of the disclosure. For example, the steps may be performed in different orders, or certain steps can be added, or certain steps can be deleted or modified. Those of ordinary skill in the field can understand and realize all or a part of the process of the above implementations, and the equivalent changes made in accordance with the claims of the disclosure still belong to the scope of the disclosure covered.

In addition, terms "first", "second", and the like are only used for illustration and cannot be understood as explicitly or implicitly indicating relative importance or implicitly indicating the number of technical features referred to herein. Therefore, features restricted by terms "first", "second", and the like can explicitly or implicitly include one or more features. In the context of the disclosure, "multiple" refers to two or more than two, unless stated otherwise.

The reference terms "an embodiment", "some embodiments", "an exemplary embodiment", "an implementation", "a specific implementation", "some implementations", or the like described herein mean that a particular feature, structure, material, or characteristic described in conjunction with the embodiments or implementations may be contained in at least one embodiment or implementation of the disclosure. The exemplary expressions of the above terms appearing in the specification does not necessarily refer to the same embodiment or implementation. Furthermore, the particular feature, structure, material, or characteristic described may be properly combined in any one or more embodiments or implementations.

It is to be understood that, the disclosure is not to be limited to be applied in the above embodiments. Those of ordinary skill in the art can make improvements or changes based on the above illustration, and all these improvements and changes should fall within the protection scope of the appended claims of the disclosure. Those of ordinary skill in the field can understand and realize all or a part of the process of the above embodiments, and the equivalent changes made in accordance with the claims of the disclosure still belong to the scope of the disclosure covered.

What is claimed is:

1. A touch panel comprising:
a touch electrode layer, wherein the touch electrode layer comprises a plurality of touch regions, the touch electrode layer is configured to sense a plurality of touched points, and the plurality of touched points comprise at least two actually touched points; and
a pressure sensing layer, wherein the pressure sensing layer comprises a plurality of sensing assemblies, positions of the plurality of sensing assemblies correspond to positions of the plurality of touch regions, respectively, the plurality of sensing assemblies are configured to sense pressed points, and each pressed point of the pressed points is used to determine one touch region where one actually touched point is located,
wherein coordinates of the plurality of touch regions are in one-to-one correspondence with coordinates of the plurality of sensing assemblies, and wherein the touch panel further comprises a controller configured to:

determine whether each touched point of the plurality of touched points has a corresponding pressed point according to merely a coordinate of each touched point of the plurality of touched points and a coordinate of each pressed point of the pressed points; and for each touched point of the plurality of touched points, determine that the touched point is one actually touched point when the touched point has a corresponding pressed point, and determine that the touched point is one ghost point when the touched point does not have a corresponding pressed point.

2. The touch panel of claim 1, wherein each sensing assembly of the plurality of sensing assemblies comprises a flexible element and a conductive element, wherein the conductive element is connected to one side of the flexible element and in conduction connection with the flexible element; and when the flexible element is touched, the flexible element deforms, a contact area between the flexible element and the conductive element increases, and a resistance of the sensing assembly decreases.

3. The touch panel of claim 2, wherein the flexible element is made of polydimethylsiloxane, and the conductive element is made of polyaniline.

4. The touch panel of claim 2, wherein the flexible element comprises a base and a plurality of protrusions, wherein the base is disposed opposite to and is spaced apart from the conductive element;

the plurality of protrusions are connected to one side of the base facing the conductive element and are in contact with the conductive element; and when the base is touched, the base deforms, the plurality of protrusions are moved towards the conductive element and deform, and a contact area between each protrusion of the plurality of protrusions and the conductive element increases.

5. The touch panel of claim 4, wherein a cross-sectional area of each protrusion of the plurality of protrusions gradually decreases in a direction from the base to the conductive element.

6. The touch panel of claim 4, wherein a height of each protrusion of the plurality of protrusions ranges from 8 um to 30 um, and a diameter of each protrusion of the plurality of protrusions ranges from 10 um to 30 um.

7. A display module, comprising:

a display panel; and a touch panel disposed at a light-exiting side of the display panel, wherein the touch panel comprises:

a touch electrode layer, wherein the touch electrode layer comprises a plurality of touch regions, the touch electrode layer is configured to sense a plurality of touched points, and the plurality of touched points comprise at least two actually touched points; and a pressure sensing layer, wherein the pressure sensing layer comprises a plurality of sensing assemblies, positions of the plurality of sensing assemblies correspond to positions of the plurality of touch regions, respectively, the plurality of sensing assemblies are configured to sense pressed points, and each pressed point of the pressed points is used to determine one touch region where one actually touched point is located, wherein coordinates of the plurality of touch regions are in one-to-one correspondence with coordinates of the plurality of sensing assemblies, and wherein the touch panel further comprises a controller configured to:

determine whether each touched point of the plurality of touched points has a corresponding pressed point according to merely a coordinate of each touched point of the plurality of touched points and a coordinate of each pressed point of the pressed points; and for each touched point of the plurality of touched points, determine that the touched point is one actually touched point when the touched point has a corresponding pressed point, and determine that the touched point is one ghost point when the touched point does not have a corresponding pressed point.

8. The display module of claim 7, wherein each sensing assembly of the plurality of sensing assemblies comprises a flexible element and a conductive element, wherein the conductive element is connected to one side of the flexible element and in conduction connection with the flexible element; and when the flexible element is touched, the flexible element deforms, a contact area between the flexible element and the conductive element increases, and a resistance of the sensing assembly decreases.

9. The display module of claim 8, wherein the flexible element is made of polydimethylsiloxane, and the conductive element is made of polyaniline.

10. The display module of claim 8, wherein the flexible element comprises a base and a plurality of protrusions, wherein the base is disposed opposite to and is spaced apart from the conductive element;

the plurality of protrusions are connected to one side of the base facing the conductive element and are in contact with the conductive element; and when the base is touched, the base deforms, the plurality of protrusions are moved towards the conductive element and deform, and a contact area between each protrusion of the plurality of protrusions and the conductive element increases.

11. The display module of claim 10, wherein a cross-sectional area of each protrusion of the plurality of protrusions gradually decreases in a direction from the base to the conductive element.

12. The display module of claim 10, wherein a height of each protrusion of the plurality of protrusions ranges from 8 um to 30 um, and a diameter of each protrusion of the plurality of protrusions ranges from 10 um to 30 um.

13. A display device, comprising:

a display module; and a driver electrically coupled to the display module and configured to drive the display module to perform image display;

the display module comprising:

a display panel; and a touch panel disposed at a light-exiting side of the display panel, wherein the touch panel comprises:

a touch electrode layer, wherein the touch electrode layer comprises a plurality of touch regions, the touch electrode layer is configured to sense a plurality of touched points, and the plurality of touched points comprise at least two actually touched points; and a pressure sensing layer, wherein the pressure sensing layer comprises a plurality of sensing assemblies, positions of the plurality of sensing assemblies correspond to positions of the plurality of touch regions, respectively, the plurality of sensing assemblies are configured to sense pressed points, and each pressed point of the pressed points is used to determine one touch region where one actually touched point is located, wherein coordinates of the plurality of touch regions are in one-to-one correspondence with coordinates of the plurality of sensing assemblies, and wherein the touch panel further comprises a controller configured to:

determine whether each touched point of the plurality of touched points has a corresponding pressed point according to merely a coordinate of each touched point of the plurality of touched points and a coordinate of each pressed point of the pressed points; and for each touched point of the plurality of touched points, determine that the touched point is one actually touched point when the touched point has a corresponding pressed point, and determine that the touched point is one ghost point when the touched point does not have a corresponding pressed point.

14. The display device of claim 13, wherein each sensing assembly of the plurality of sensing assemblies comprises a flexible element and a conductive element, wherein

16 the conductive element is connected to one side of the flexible element and in conduction connection with the flexible element; and when the flexible element is touched, the flexible element deforms, a contact area between the flexible element and the conductive element increases, and a resistance of the sensing assembly decreases.

15. The display device of claim 14, wherein the flexible element is made of polydimethylsiloxane, and the conductive element is made of polyaniline.

16. The display device of claim 14, wherein the flexible element comprises a base and a plurality of protrusions, wherein the base is disposed opposite to and is spaced apart from the conductive element;

the plurality of protrusions are connected to one side of the base facing the conductive element and are in contact with the conductive element; and when the base is touched, the base deforms, the plurality of protrusions are moved towards the conductive element and deform, and a contact area between each protrusion of the plurality of protrusions and the conductive element increases.

17. The display device of claim 16, wherein a cross-sectional area of each protrusion of the plurality of protrusions gradually decreases in a direction from the base to the conductive element.

* * * * *